(12) United States Patent
Storey et al.

(10) Patent No.: US 12,535,833 B2
(45) Date of Patent: Jan. 27, 2026

(54) ANGLE SELECTION FOR MOWER PATH PLANNING

(71) Applicant: FireFly Automatix, Inc., Salt Lake City, UT (US)

(72) Inventors: Kyle R. Storey, Farmington, UT (US); Adam Lawrence Aposhian, Fruit Heights, UT (US); Vinayak Ruia, Brooklyn, NY (US); Eric E. Aston, Farmington, UT (US)

(73) Assignee: FireFly Automatix, Inc., Salt Lake City, UT (US)

( * ) Notice: Subject to any disclaimer, the term of this patent is extended or adjusted under 35 U.S.C. 154(b) by 92 days.

(21) Appl. No.: 18/411,293

(22) Filed: Jan. 12, 2024

(65) Prior Publication Data

US 2025/0231569 A1 Jul. 17, 2025

(51) Int. Cl.
  *G05D 1/648* (2024.01)
  *A01D 34/00* (2006.01)
  *G05D 105/15* (2024.01)

(52) U.S. Cl.
  CPC ......... *G05D 1/6484* (2024.01); *A01D 34/008* (2013.01); *G05D 2105/15* (2024.01)

(58) Field of Classification Search
  CPC . G05D 1/6484; G05D 2105/15; A01D 34/008
  USPC .......................................................... 701/410
  See application file for complete search history.

(56) References Cited

U.S. PATENT DOCUMENTS 9,471,063 B2 * 10/2016 Ouyang .................. G01S 11/14
2017/0150676 A1 * 6/2017 Yamauchi ............ G05D 1/0219

FOREIGN PATENT DOCUMENTS

| CN | 109258060 A | * | 1/2019 | .......... A01D 34/008 |
|---|---|---|---|---|
| CN | 110793524 A | * | 2/2020 | ............. G01S 19/42 |
| CN | 117249834 A | * | 12/2023 | ............. G01C 21/20 |
| WO | WO-2022120713 A1 | * | 6/2022 | .......... A01D 34/008 |
| WO | WO-2022143506 A1 | * | 7/2022 | |

* cited by examiner

*Primary Examiner* — Muhammad Shafi
(74) *Attorney, Agent, or Firm* — Kirton McConkie; Brian Tucker

(57) ABSTRACT

Techniques are provided for selecting one or more angles for parallel lines of a path a mower will traverse while cutting an area. Each angle can be selected based on its alignment with the boundary of the area to thereby minimize the amount of grass that will remain uncut when the mower traverses a path that includes parallel lines at the selected angle.

20 Claims, 12 Drawing Sheets

ANGLE SELECTION FOR MOWER PATH PLANNING

CROSS-REFERENCE TO RELATED APPLICATIONS

N/A

BACKGROUND

Some mowers, such as those used to mow sod farms, golf courses, baseball fields, etc., are configured to traverse a defined path within an area to be mowed. For example, mowers may be configured to mow the outfield of a baseball field or the fairway of a golf course in parallel lines (or swaths). When cutting an area in this manner, a substantial amount of grass may remain uncut around the border of the area. For example, due to the shape of the borders, the mower may need to turn around early to maintain the angle of the straight lines. This could necessitate making additional passes along the border to fully cut the field.

BRIEF SUMMARY

The present disclosure extends to techniques for selecting one or more angles for parallel lines of a path a mower will traverse while cutting an area. Each angle can be selected based on its alignment with the boundary of the area to thereby minimize the amount of grass that will remain uncut when the mower traverses a path that includes parallel lines at the selected angle.

In some embodiments, the present disclosure provides a method for planning a path for mowing an area. In this method, a boundary of the area can be identified. A first angle from a range of angles can be identified as a best aligned angle for the boundary. Then, the path for mowing the area can be created where the path includes parallel lines that are oriented in accordance with the best aligned angle.

In some embodiments, the boundary may be defined by coordinates and the method may further include generating boundary segment vectors for pairs of the coordinates.

In some embodiments, the boundary segment vectors may be generated for successive pairs of the coordinates.

In some embodiments, the method may further include comparing the boundary segment vectors to a set of vectors corresponding to the range of angles.

In some embodiments, the method may further include, based on the comparison, generating results for each angle in the range of angles, each result representing a number or proportion of boundary segment vectors that are aligned with the respective vector.

In some embodiments, comparing the boundary segment vectors to the set of vectors corresponding to the range of angles may include calculating, for each vector in the set of vectors, dot products of the respective vector and the boundary segment vectors. The result for the respective vector may be a sum of the dot products for the respective vector.

In some embodiments, the result for the respective vector may be a sum of the dot products for the respective vector after raising each of the dot products to an even number.

In some embodiments, identifying the first angle as the best aligned angle may include selecting the first angle based on the result for the first angle.

In some embodiments, selecting the first angle based on the result for the first angle may include determining that the result for the first angle is a maximum result.

In some embodiments, selecting the first angle based on the result for the first angle may include determining that the result for the first angle exceeds a threshold.

In some embodiments, the parallel lines may be oriented at or within a threshold of the best aligned angle.

In some embodiments, the method may further include identifying curvature spikes in the boundary and identifying intervening segments between adjacent curvature spikes. Identifying the first angle from the range of angles as the best aligned angle for the boundary may include determining that a first intervening segment of the intervening segments is oriented at the first angle.

In some embodiments, determining that the first intervening segment is oriented at the first angle may include calculating a vector for the first intervening segment.

In some embodiments, identifying the first angle from the range of angles as the best aligned angle for the boundary may include determining that one or more additional intervening segments of the intervening segments are oriented at the first angle.

In some embodiments, the boundary may be defined by coordinates and identifying curvature spikes in the boundary may include creating sets of coordinates from the coordinates defining the boundary and calculating a curvature value for each set.

In some embodiments, the sets of coordinates may include three coordinates and calculating the curvature value for each set may include calculating a circle having a circumference that aligns with the three coordinates in the set.

In some embodiments, the present disclosure provides computer storage media storing computer executable instructions which when executed implement a method for planning a path for mowing an area. The method includes obtaining coordinates that define a boundary of the area and creating boundary segment vectors from pairs of the coordinates. The method also includes, for each angle in a range of angles, creating a vector corresponding to the angle and comparing the vector to each of the boundary segment vectors to generate a result for the angle. The method further includes, based on the results for the range of angles, identifying a best aligned angle. The method additionally includes creating the path for mowing the area where the path includes parallel lines that are oriented in accordance with the best aligned angle.

In some embodiments, comparing the vector to each of the boundary segment vectors may include calculating a dot product, and the result for each angle may be generated by raising the respective dot products to an even value and summing the raised dot products.

In some embodiments, the present disclosure provides computer storage media storing computer executable instructions which when executed implement a method for planning a path for mowing an area. The method includes obtaining coordinates that define a boundary of the area and processing the coordinates to identify curvature spikes in the boundary. The method also includes identifying intervening segments between adjacent curvature spikes and determining angles of the intervening segments. The method further includes selecting a first angle of the determined angles as a best aligned angle. The method additionally includes creating the path for mowing the area where the path includes parallel lines that are oriented in accordance with the best aligned angle.

In some embodiments, processing the coordinates to identify curvature spikes in the boundary may include creating sets of the coordinates and calculating a circle for each set using the coordinates of the set.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Embodiments of the present disclosure may be used to generate a path (or portion of a path) that a mower may traverse while cutting an area. Common areas may include sports fields (baseball outfields, football fields, soccer fields, fairways, etc.), sod farms, and parks. However, embodiments of the present disclosure could be used to enhance efficiency and/or quality when cutting any area. Also, embodiments of the present disclosure may be particularly beneficial for autonomous mowers which automatically traverse a defined path. However, embodiments of the present disclosure could also be used to generate a path that a human operator may manually cause a mower to traverse. In short, embodiments of the present disclosure are directed to techniques for determining one or more angles for parallel lines in a path regardless of how a mower may ultimately be caused to traverse the path.

Figure 1:
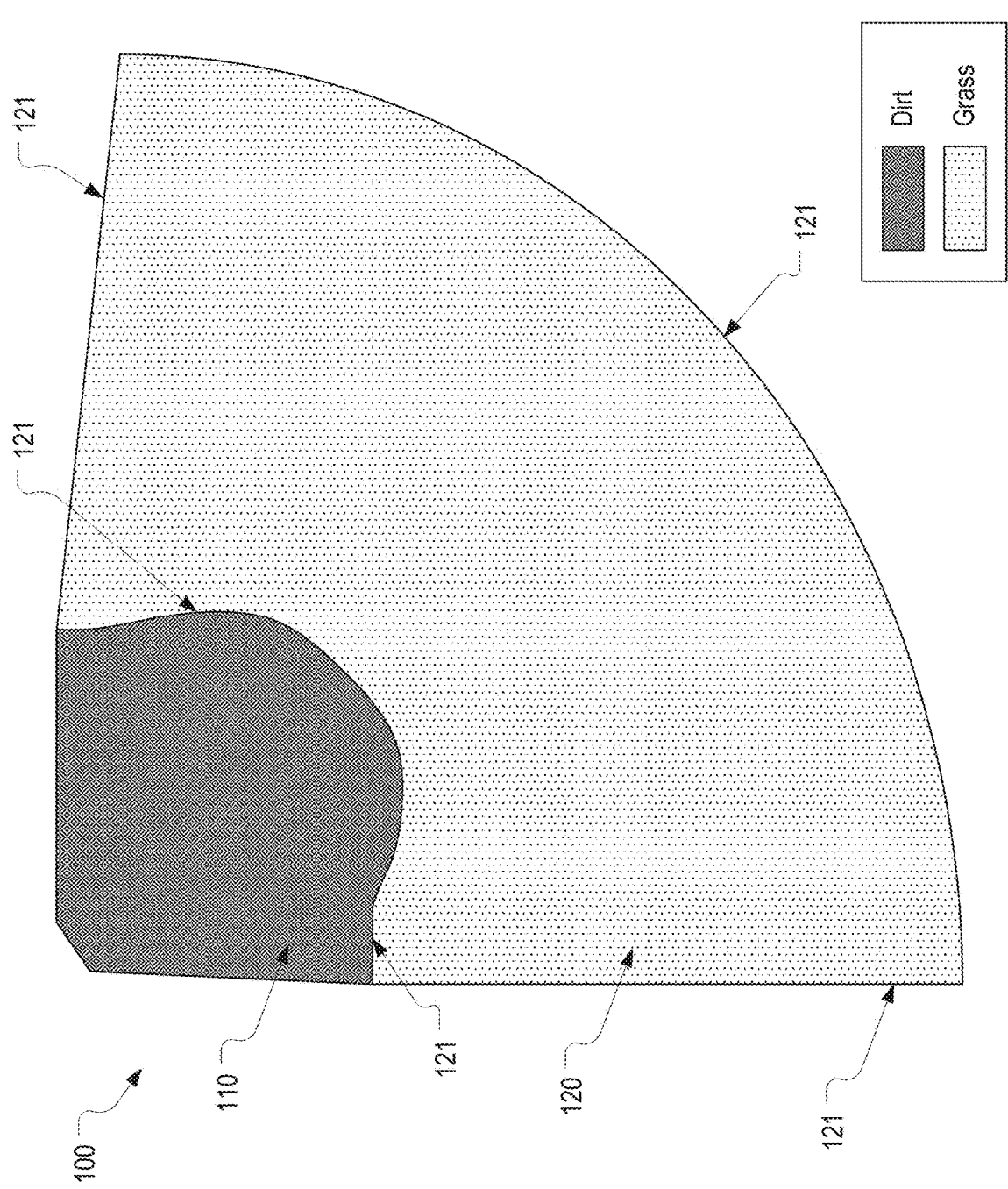
FIG. 1 illustrates an example of an area that may be cut using techniques of embodiments of the present disclosure.

FIG. 1 is an aerial view of a baseball field 100 having a dirt infield 110 and a grass outfield 120 (or an area 120 that may be cut by a mower). Area 120 includes a boundary 121 which is defined by the edge of the infield, the first and third base foul lines and the home run fence. An autonomous mower could be configured to traverse a predefined path across area 120 or a human operator could be prompted to cause the mower to traverse the predefined path. It is common to choose a path that includes parallel lines, whether for efficiency, appearance, or both (e.g., to create the striped appearance in a baseball outfield). Yet, given the variability in boundary 121, a path that traverses parallel lines is likely to result in significant unmowed sections particularly at portions of boundary 121 that are not substantially parallel to the lines.

Figure 2:
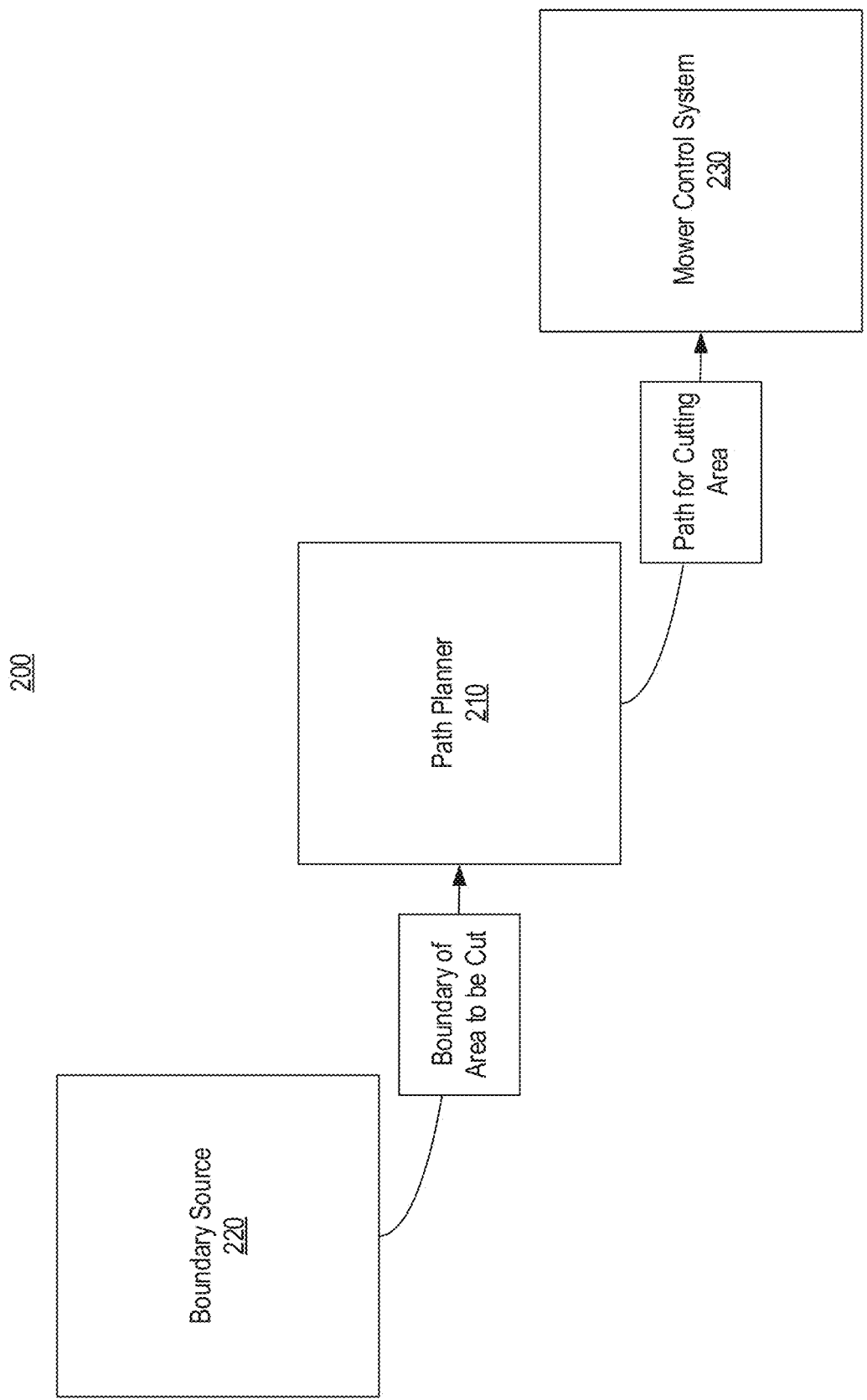
FIG. 2 provides an example of a system that may be employed to implement embodiments of the present disclosure.

FIG. 2 illustrates an example system 200 that may be employed to implement embodiments of the present disclosure. System 200 includes a path planner 210 that is configured to generate a path for an area to be cut. Path planner 210 can represent any type and/or arrangement of computing components that are capable of implementing the functionality described herein. For example, path planner 210 could be a cloud-based service that is accessible to individuals desiring to define paths for their mowers to traverse.

System 200 may also include a boundary source 220 that provides a boundary of an area to be cut to path planner 210. System 200 may further include a mower control system 230 that receives a path for cutting an area from path planner 210. Boundary source 220 could be anything capable of identifying a boundary of an area. For example, boundary source 220 could be a GPS component on a mower (or other vehicle or tool) that generates coordinates as the mower travels along the boundary. As another example, boundary source 220 could be a tool that processes an aerial image of an area to generate coordinates defining the area's boundary. As a further example, boundary source 220 could be a tool that enables a user to define (e.g., draw) a boundary on a map (e.g., on Google Earth or other mapping software) and then generates coordinates from the defined boundary. The coordinates may typically be x, y coordinates, but any other coordinate system could be used (e.g., polar coordinates). The coordinates defining the boundary of an area could also be spaced at any reasonable distance including at a uniform distance (e.g., every one meter) or at a non-uniform distance. In short, path planner 210 can receive some definition of a boundary from boundary source 220.

Mower control system 230 can be any suitable set of components for controlling the operation of a mower that is to be used to mow the area defined by the boundary. As one example, mower control system 230 could represent an autonomous controller that steers the mower based on a predefined path it may receive from path planner 210. As another example, mower control system 230 could represent a controller that displays a predefined path it may receive from path planner 210 to allow a human operator to steer the mower along the path. Mower control system 230 may receive a path from path planner 210 in any suitable manner including directly via internet communications or indirectly via one or more other computing systems. In some embodiments, path planner 210 could be integrated into mower control system 230. In some embodiments, mower control system 230 could be boundary source 220.

As an overview of embodiments of the present disclosure, path planner 210 can be configured to process a boundary of an area to determine an angle that is best aligned with the boundary and may then define a path for mowing the area which includes parallel lines that match the angle. Path planner 210 may employ different techniques for identifying a "best aligned angle" for a given boundary as described below. In some embodiments, path planner 210 may identify more than one angle that is best aligned. In such cases, path planner 210 could give a user the option to select one of such angles to be used when defining the parallel lines of the path. In this way, path planner 210 can generate a path for cutting an area with parallel lines which may also minimize the number of additional passes a mower will have to make along the boundary.

FIGS. 3A-3G provide an example of how path planner 210 may generate a path for cutting an area where the path includes parallel lines matching an angle that is determined in accordance with one or more embodiments of the present disclosure. In this example, it is assumed that the area to be cut is area/outfield 120 in FIG. 1.

Figure 3A:
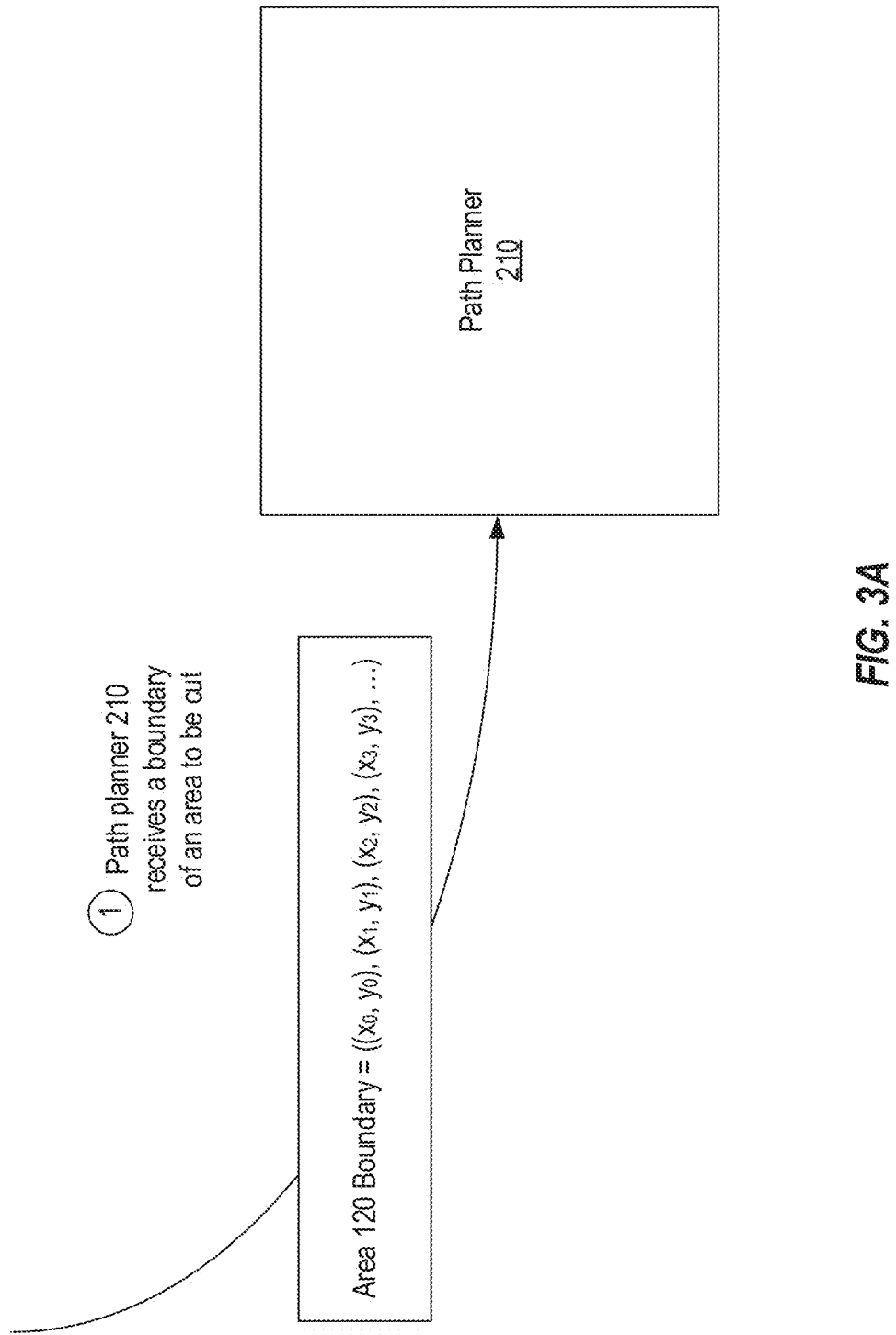
FIGS. 3A-3G provide an example of how a path planner may generate a path for cutting an area where the path includes parallel lines matching an angle that is determined in accordance with one or more embodiments of the present disclosure.

Turning to FIG. 3A, in step 1, it is assumed that path planner 210 receives information defining the boundary of area 120. As represented, in some embodiments, this step could entail receiving a sequence of coordinates along the boundary of area 120. In some embodiments, path planner 210 could preprocess coordinates it receives such as to reduce the number of coordinates (e.g., to create a set of coordinates that are spaced at one-meter increments), to standardize the coordinates (e.g., to convert absolute coordinates into relative coordinates or vice versa, to convert from one coordinate system to another, etc.), or to perform some other processing to facilitate the calculation of a best aligned angle. In other embodiments, step 1 could entail receiving non-coordinate information defining the boundary (e.g., information defining line segments), and in such cases, path planner 210 could generate the coordinates (e.g., by generating coordinates at one-meter increments along the defined boundary). Notably, the coordinates that path planner 210 receives or generates may but need not be evenly spaced along the boundary. To simplify the example, it can be assumed that the coordinates received by path planner 210 in step 1 define coordinates that begin and end at the top, left corner of area 120 near third base and are spaced at one-meter increments.

Figure 3B:
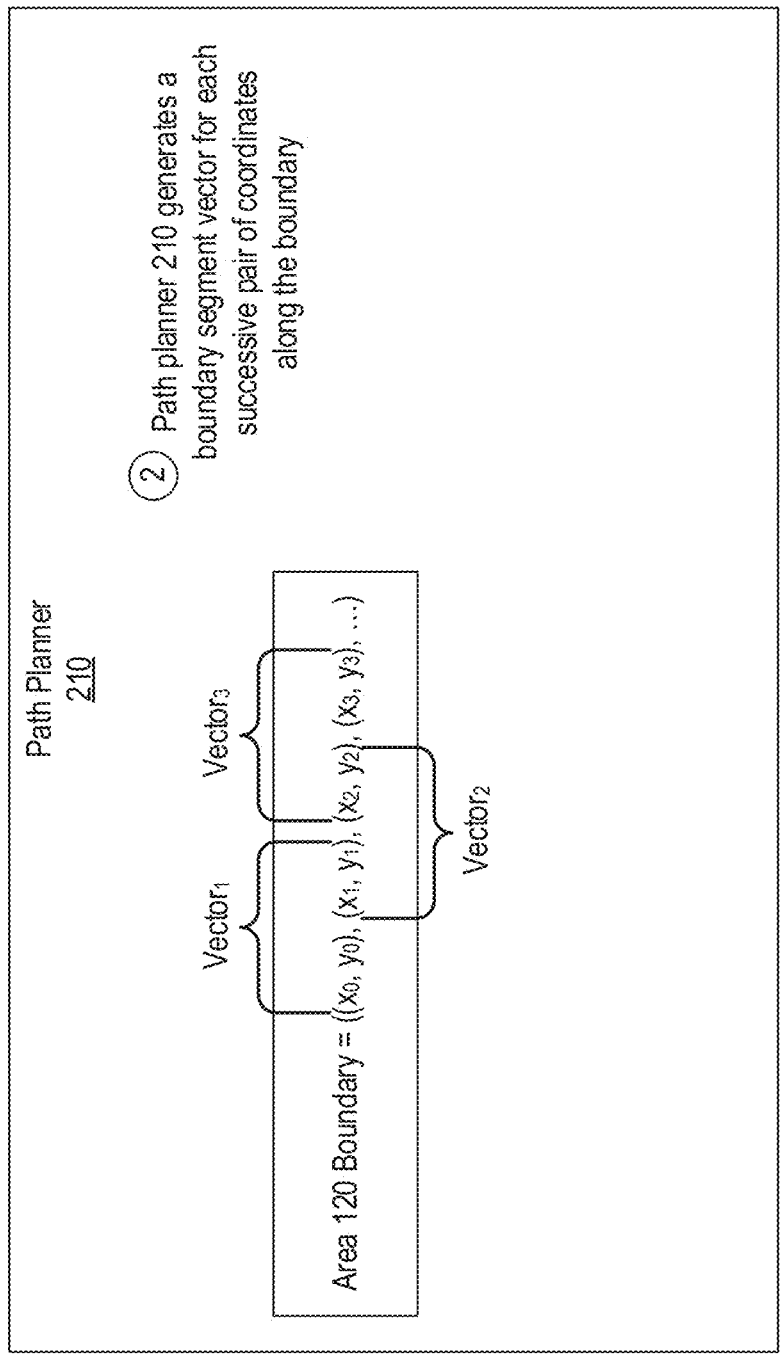

Turning to FIG. 3B, in step 2, path planner 210 can generate a boundary segment vector for each successive pair of coordinates along the boundary. For example, in FIG. 3B, a first vector, $Vector_1$, can be calculated using the first coordinates $(x_0, y_0)$ and the second coordinates $(x_1, y_1)$ as $Vector_1 = ((x_1 - x_0), (y_1 - y_0))$, a second vector, $Vector_2$, can be calculated using the second coordinates $(x_1, y_1)$ and the third coordinates $(x_2, y_2)$ as $Vector_2 = ((x_2 - x_1), (y_2 - y_1))$, and so on until reaching a last vector, $Vector_n$, which can be calculated using the last coordinates $(x_n, y_n)$ and the first coordinates $(x_0, y_0)$ as $Vector_n = ((x_0 - x_n), (y_0 - y_n))$. In some embodiments, path planner 210 may use non-adjacent coordinates to generate such vectors. For example, path planner 210 could use every other coordinate that defines the boundary (e.g., by calculating the first vector using the first and third coordinates, the second vector using the third and fifth coordinates, etc.). In other words, path planner 210 may use any reasonable combination of coordinates to generate vectors in step 2.

Figure 3C:
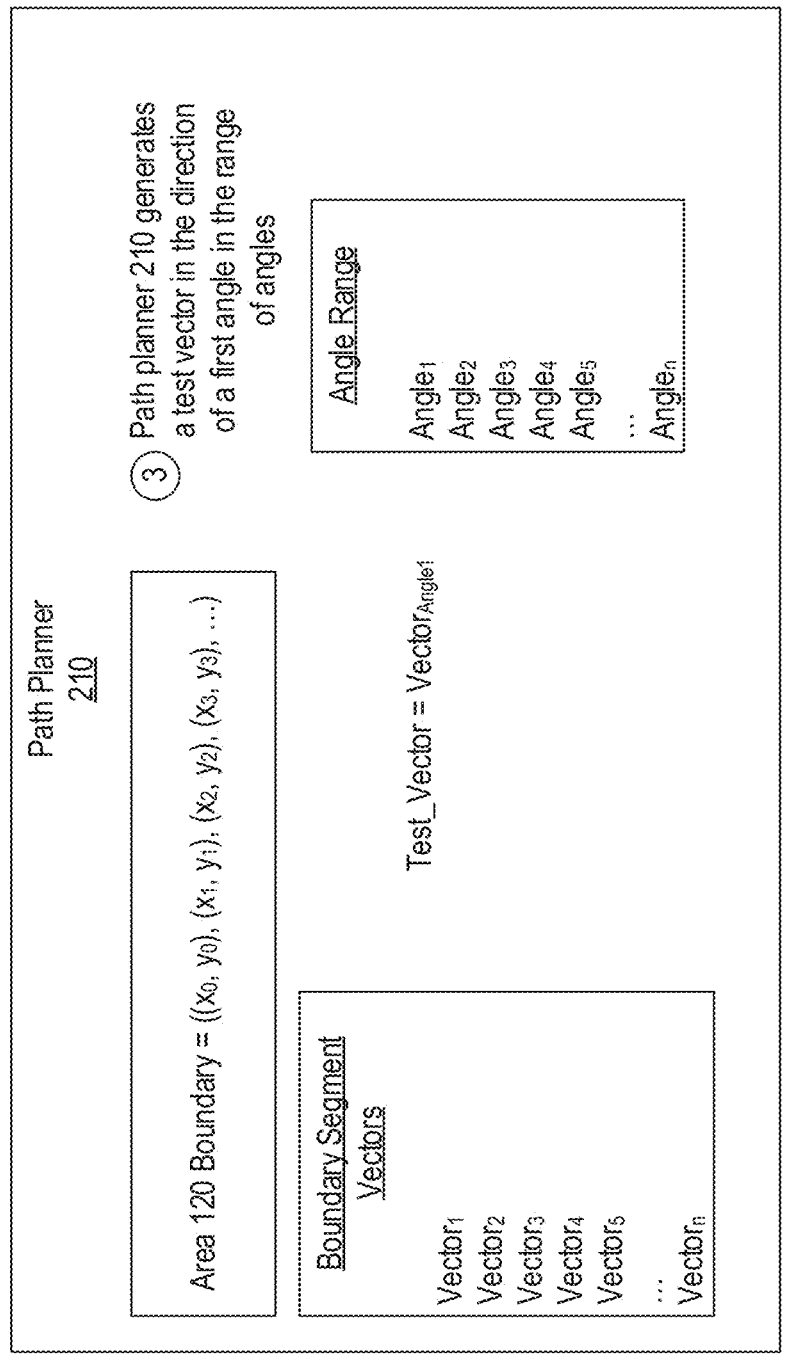

Turning to FIG. 3C, in step 3, path planner 210 can generate a test vector in the direction of a first angle in a range of angles. For example, the range of angles may include angles ranging from −90° to 89° in 1° increments. Preferably, the range of angles may span 180° to encompass all orientations of the mower while ignoring direction (e.g., −90° and 90° can be considered the same angle). Any reasonable increment could be used (e.g., 0.5°, 1°, 2°, 5°, etc.). As an example in which the range of angles is −90° to 89°, the test vector for the first angle (−90°) could be defined as $Test\_Vector = Vector_{Angle1} = (\sin(-90°), \cos(-90°)) = (-1, 0)$.

Figure 3D:
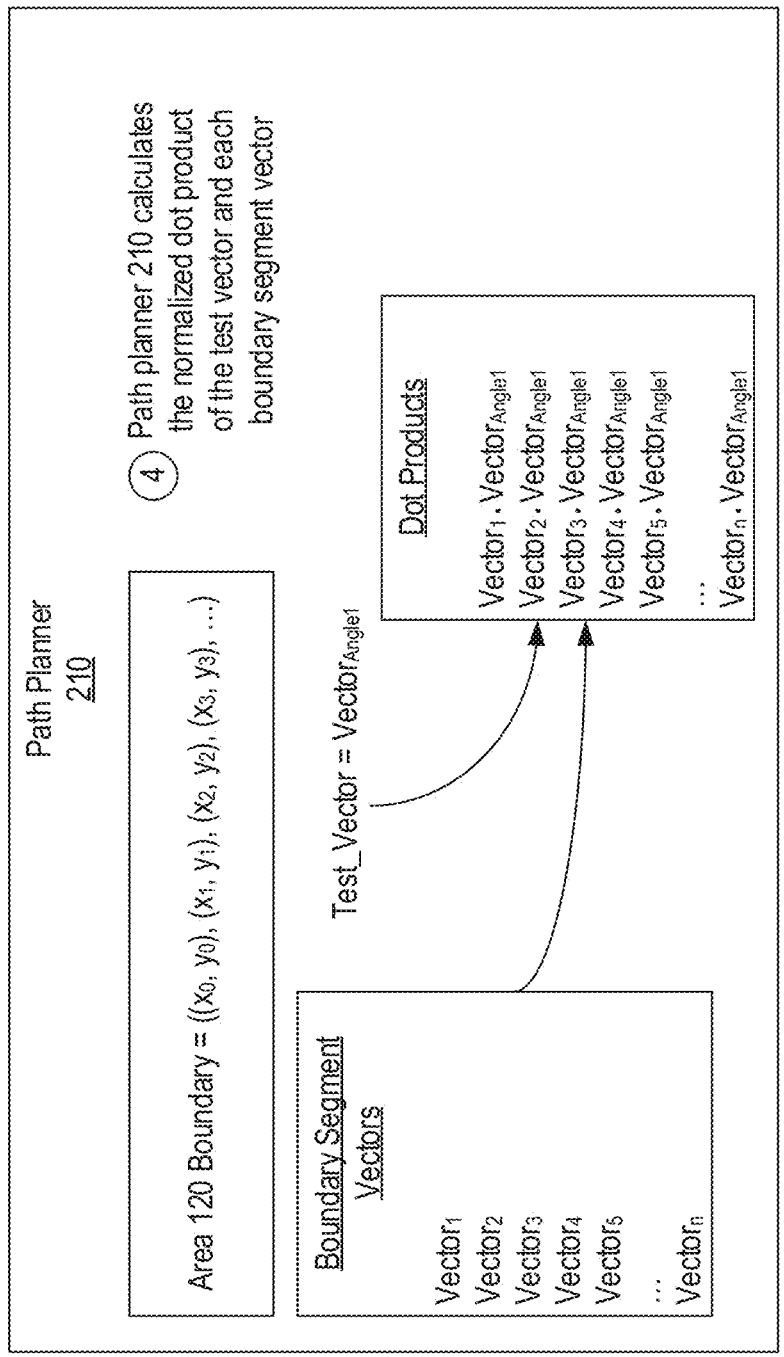

Turning to FIG. 3D, in step 4, path planner 210 can calculate the dot product of the test vector and each boundary segment vector. For example, the dot product of $Vector_1$ and $Vector_{Angle1}$ can be calculated as $|Vector_1||Vector_{Angle1}|\cos(\alpha)$ where $\alpha$ is the angle between the two vectors, or more simply as $x_1 * x_2 + y_1 * y_2$. In some embodiments, the two vectors may be normalized (i.e., converted to unit vectors) prior to calculating their dot product.

For a given test vector, the dot product will be maximized when the boundary segment vector is at the same angle as (or the closest angle to) the test vector and will be minimized when the boundary segment vector is perpendicular to this angle. However, the dot product will also have a significant value when the boundary segment vector is at all other non-perpendicular angles.

Figure 3E:
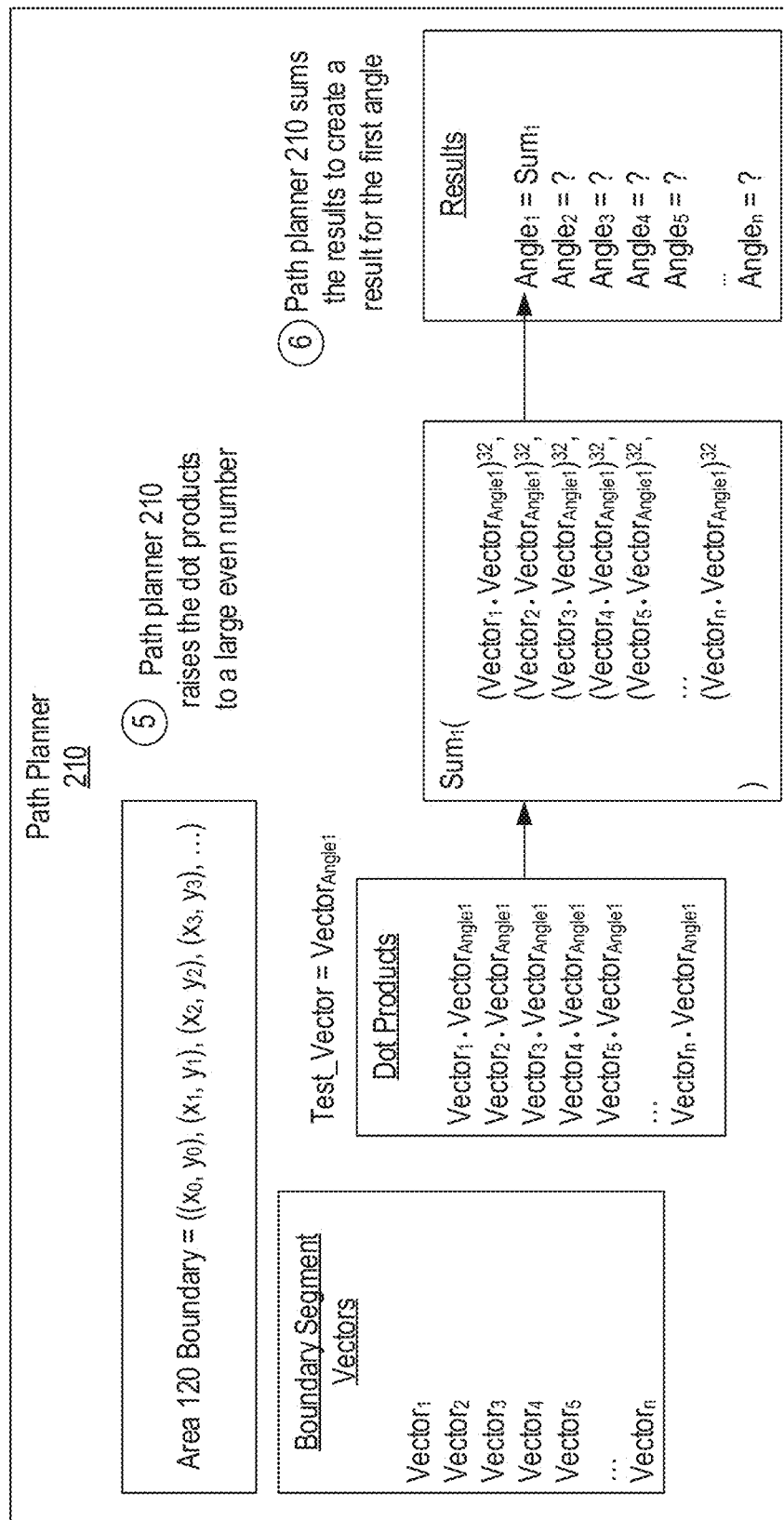

Turning to FIG. 3E, in step 5, path planner 210 can raise each dot product to a large even power such as 32. By raising the dot products to a large even power, the dot product for any boundary segment vectors that are closely aligned with the test vector will retain a significant value while the dot product for any boundary segment vectors that are not closely aligned with the test vector will diminish towards zero. Accordingly, raising the dot products to the large even power provides a way to "filter out" boundary segment vectors that are not closely aligned with the particular test vector. The value to which the dot products are raised can be adjusted to control what is considered "closely aligned." For example, raising the dot products to a lower even number will cause a greater range of angle differences to be considered closely aligned. Then, in step 6, path planner 210 can sum the raised dot products to generate a result for the first angle. In this way, the result for the first angle can generally represent how many of the boundary segment vectors are oriented at (or close to) the first angle. For example, if many of the boundary segment vectors are oriented at the first angle, many of the raised dot products will have significant values thus creating a relatively large sum as the result for the first angle. In contrast, if a small number of boundary segment vectors are oriented at or near the first angle, only a small number of the raised dot products will have a significant value thus creating a relatively small, and possibly near zero, result for the first angle.

Figure 3F:
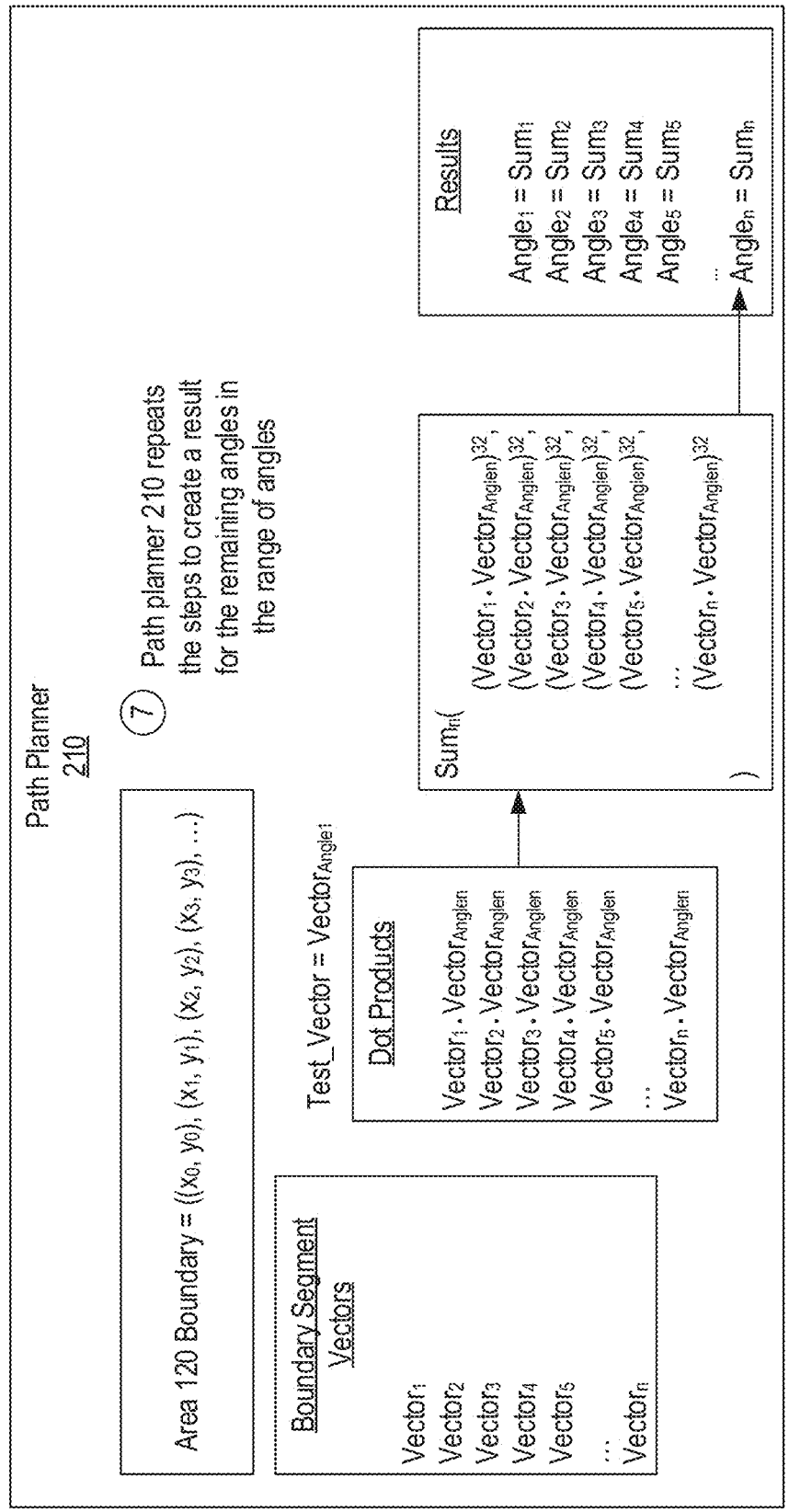

Turning to FIG. 3F, in step 7, path planner 210 can repeat steps 3-6 for the remaining angles to thereby create a result for each angle in the range of angles. As stated above, each of these results can generally represent the number or proportion of boundary segment vectors that closely align with the respective angle. As such, each result also functions as a measure of how many boundary segments are oriented at (or near) the respective angle.

Figure 3G:
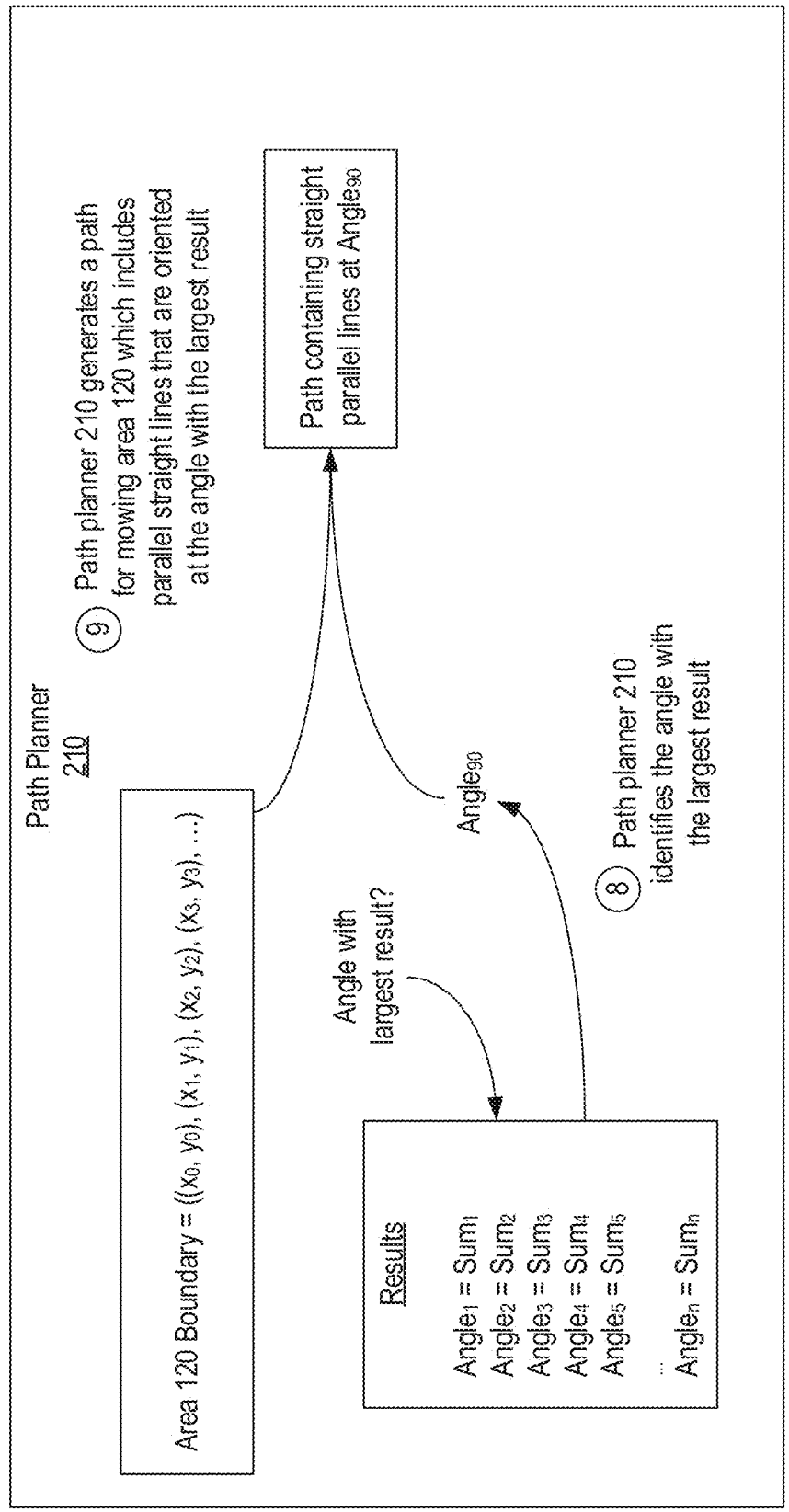

Turning to FIG. 3G, in step 8, path planner 210 can identify the angle with the largest result as the best aligned angle. This best aligned angle should be the angle with which the most boundary segments are aligned (or closely aligned). In other words, if a mower is traveling along the boundary of the area, it may be oriented in this angle more than any other angle. In the depicted example, it is assumed that the angle with the largest result is $Angle_{90}$ which could represent a vertical (or 0°) angle relative to area 120 as shown in FIG. 1. It can be seen that this vertical angle corresponds with the boundary along the first base foul line, a small portion of the boundary along the infield near third base, and a small portion of the boundary defining the home run fence at the third base foul line.

In step 9, path planner 210 can generate a path for mowing area 120 which includes parallel lines that are oriented at the best aligned angle. Due to the parallel lines being aligned with a large number or proportion of boundary segments, the defined path should minimize the amount of the area that is not cut due to the turning that must be performed to form the parallel lines. The defined path should therefore minimize the number of additional passes a mower must make to complete mowing of the area or otherwise enhance the efficiency of the path without sacrificing the aesthetics of the parallel lines.

In some embodiments, step 8 may entail identifying a set of best aligned angles as those having results above a threshold rather than identifying a single best aligned angle having the highest result. In such cases, path planner 210 may provide an option to select a particular angle from among these best aligned angles to be used for the parallel lines in the path. In some embodiments, path planner 210 could provide an option to select one best aligned angle for the parallel lines in one section of the area, another best aligned angle for the parallel lines in another section of the area, etc.

In embodiments where the boundary segment lengths may not be uniform (e.g., when the coordinates are not evenly spaced), path planner 210 may apply a correction to the raised dot products to account for the segment lengths. For example, after raising the dot product to the large even power, the result could be multiplied by the length of the segment so that a result for a longer segment is given greater weight than a result for a shorter segment.

In some embodiments, path planner 210 could use a reduced set of test angles to generate a reduced result set (e.g., to reduce computational loads and/or to obtain results more quickly). The results could then be fit to a polynomial, spline, or other regression and then a maxima could be identified to determine the angle with which the most boundary segments are closely aligned. Such approaches could allow angles outside of the range of test angles to be identified as the best aligned angle.

In some embodiments, path planner 210 could be configured to employ trigonometric functions (e.g., sine and cosine) in place of the dot product to generate a result of how closely each segment boundary vector aligns with a given test angle. In some embodiments, path planner 210 could generate a result for a particular test angle using a Gaussian curve or other function (as opposed to summing dot products or results of trigonometric calculations).

Figure 4A:
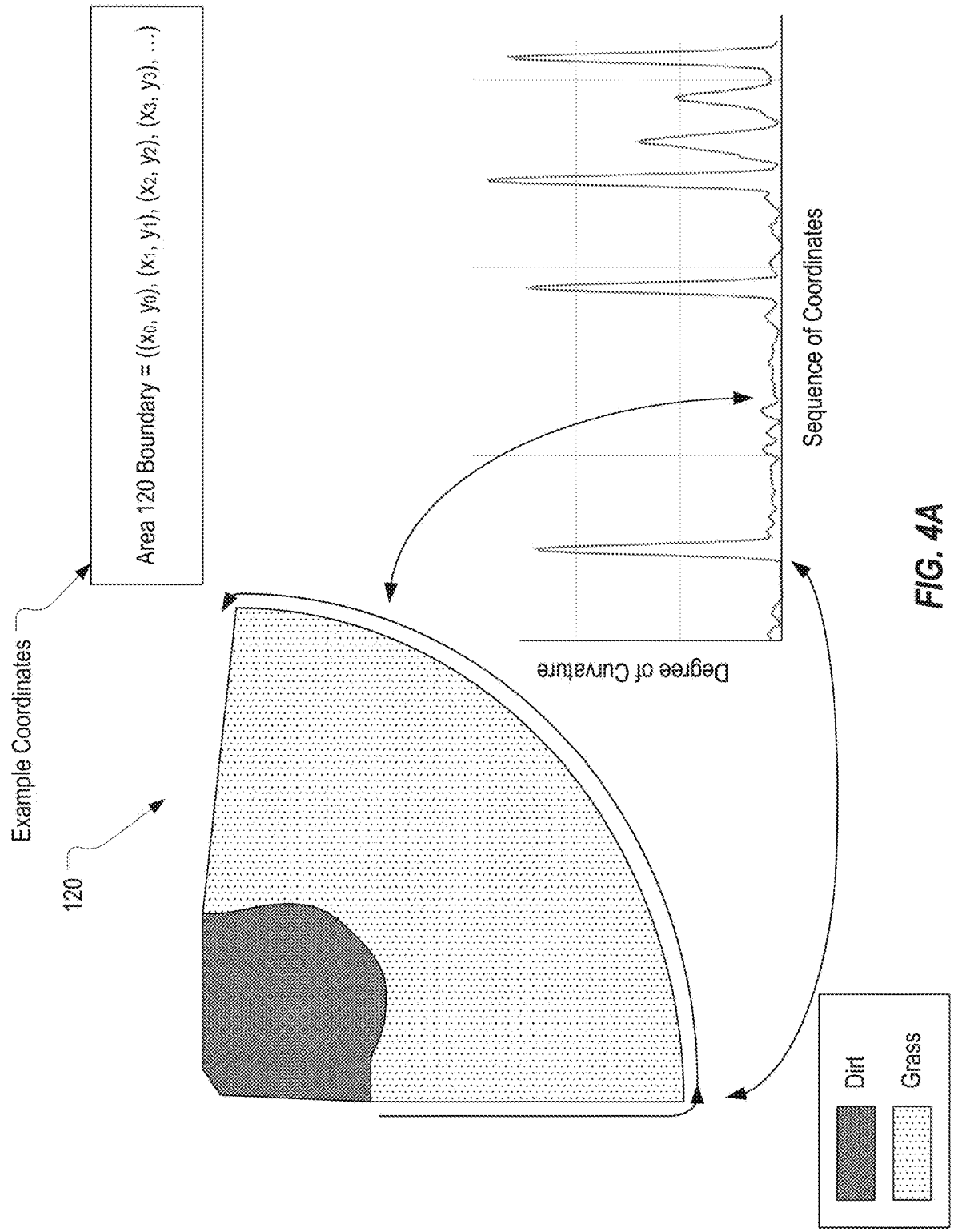
FIGS. 4A-4C provide another example of how a path planner may generate a path for cutting an area where the path includes parallel lines matching an angle that is determined in accordance with one or more embodiments of the present disclosure.
Figure 4B:
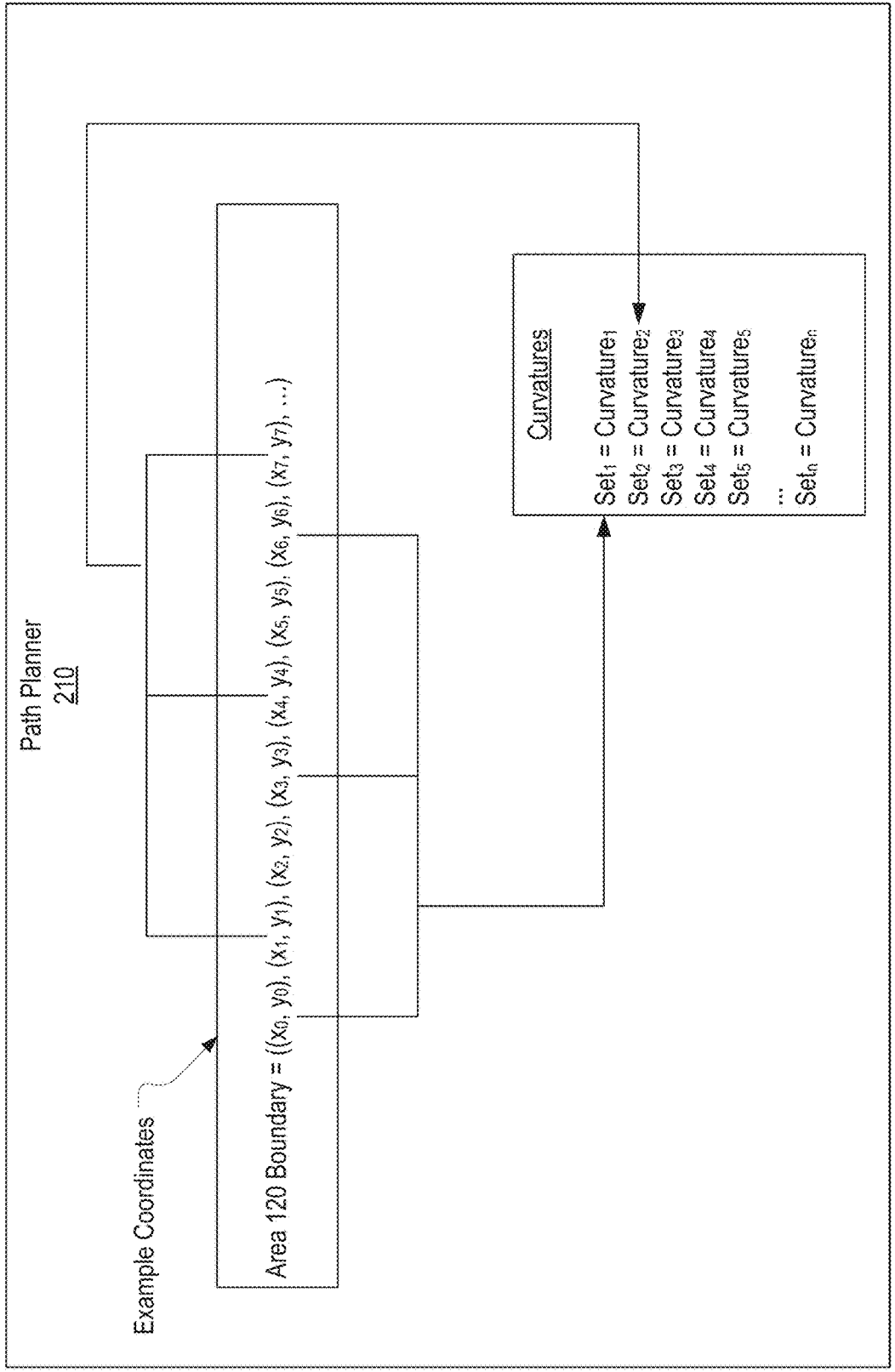
Figure 4C:
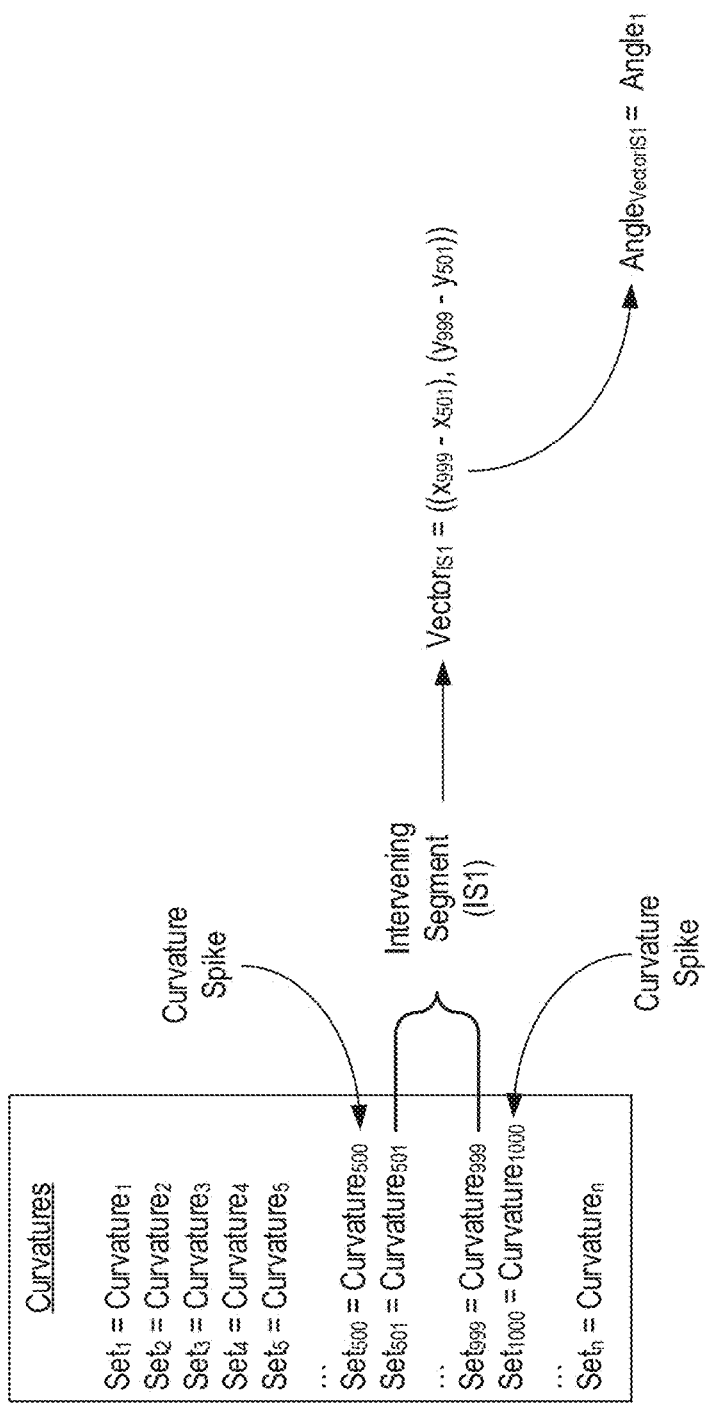

In some embodiments, path planner 210 may be configured to select a best aligned angle or angles using a curvature segmentation approach. FIGS. 4A-4C provide an overview of this curvature segmentation approach in the context of area 120 of FIG. 1. With this approach, path planner 210 can receive a sequence of coordinates defining the boundary of the area to be cut (e.g., similar to step 1 of FIG. 3A). However, for purposes of this example, it is assumed that the sequence of coordinates begin in the top corner near first base and proceed counterclockwise around the boundary as represented by the arrow.

Path planner 210 can process the sequence of coordinates to identify when turns occur in the boundary. Prior to describing how path planner 210 may accomplish this, FIG. 4A will be described to provide context. FIG. 4A includes a graph to visually represent the degree of curvature in a sequence of coordinates. Initially, the coordinates represent travelling downward along a substantially straight line and therefore the first portion of the graph remains near zero. Then, there is a sharp spike in curvature representing the turn into the portion of the boundary along the home run fence. The home run fence has a gradual curve and therefore the graph remains near zero until the next spike representing the turn onto the third base foul line. The graph then remains near zero representing the substantially straight third base foul line. Finally, the graph includes successive spikes representing the frequent turns along the infield.

When using the curvature segmentation approach, path planner 210 can identify these spikes in curvature and use them to identify intervening straight segments for which vectors may be defined. The angles of these vectors can then be used in a similar manner as described above to identify the best aligned angle or angles. For example, the angle of the single longest vector could be selected as the best aligned angle for the parallel lines. As another example, the length of vectors having the same or similar angle could be summed and then the angle corresponding to the largest sum could be selected as the best aligned angle.

In some embodiments, the existence (or extent) of a curve in the coordinates defining the boundary can be determined by selecting sets of three coordinates and for each set identifying a circle that aligns with each of the three coordinates. In some embodiments, such as is represented in FIG. 4B, a set of three coordinates may not be successive coordinates but may be spaced apart by a defined step. For example, if the step is three, a first set may include $(x_0, y_0)$, $(x_3, y_3)$, and $(x_6, y_6)$, a second set may include $(x_1, y_1)$, $(x_4, y_4)$, and $(x_7, y_7)$, etc. Continuing this example, path planner 210 could be configured to calculate a circle whose circumference lies on $(x_0, y_0)$, $(x_3, y_3)$, and $(x_6, y_6)$, and so on. Path planner 210 can use the radius of this circle to define a degree of curvature for the set of coordinates. For example, if the three coordinates lie on a common line, a circle cannot be defined and a zero curvature can be associated with the set. If the coordinates are slightly offset from a common line, the radius of the circle will be very large and a low degree of curvature can be associated with the set. If the coordinates diverge substantially from a common line, the radius of the circle will be small and a high degree of curvature can be associated with the set. In some embodiments, path planner 210 can be configured to determine the curvature for a set of coordinates by dividing 1 by the radius of the circle calculated for the set. The end result of this process can be a series of curvature values associated with the sets of coordinates such as is represented in FIG. 4B.

In some embodiments, path planner 210 may be configured to average the curvature values. For example, the series of curvature values obtained above could be further processed by averaging each curvature value with a number (e.g., 3) of adjacent curvature values within the series (e.g., by setting $Curvature_1$ to the average of $Curvature_1$, $Curvature_2$, $Curvature_3$, and $Curvature_4$).

Path planner 210 can then use the series of curvature values, which could be averaged, to identify curvature spikes (e.g., local maxima of the curvature values). For example, in some embodiments, path planner 210 can consider a curvature value as representing a curvature spike when it is within some threshold of the maximum curvature value. In some embodiments, this threshold may be 25% of the maximum curvature value. For example, if the maximum curvature value for any set of coordinates is 1, path planner 210 can select any set of coordinates with a curvature value of at least 0.25 as representing a curvature spike.

Once each curvature spike is identified, path planner 210 can determine the length of the segment between each set of curvature spikes (or an "intervening segment"). In particular, each curvature spike is associated with the set of coordinates and therefore path planner 210 can use the set of coordinates for two adjacent curvature spikes to identify the start and end of the intervening segment. For example, path planner 210 may use one of the coordinates in the set associated with a preceding curvature spike and one of the coordinates in the set associated with the subsequent curvature spike to define the beginning and end of the intervening segment. In some embodiments, path planner 210 may use an offset to select the coordinates for the start and end of the intervening segment (e.g., coordinates after the preceding curvature spike and coordinates before the subsequent curvature spike). FIG. 4C provides an example in which it is assumed that path planner 210 has determined that a first curvature spike ends at $Curvature_{500}$ and a second curvature spike starts at $Curvature_{1000}$. In this example, path planner 210 could use the coordinates of $Set_{501}$ as the start of the intervening segment and the coordinates of $Set_{999}$ as the end of the intervening segment.

In some embodiments, path planner 210 may calculate the length of the intervening segment to identify any intervening segment that is too short to be considered further (e.g., an intervening segment that spans only four coordinates). If the length of the intervening segment is greater than a threshold, path planner 210 may determine an angle of the intervening segment and store the angle. In some embodiments, and as is represented in FIG. 4C, the angle of an intervening segment may be determined by creating a vector for the intervening segment (e.g., using the start and end coordinates mentioned above) and calculating the angle of the vector. As mentioned above, at this point, the angles of the intervening segments can be used to determine the angle of the parallel lines in a path for cutting the area. For example, path planner 210 may sum the lengths of any vectors having the same (or similar) angle and then choose the angle associated with the largest sum as the angle for the parallel lines in the path.

In summary, path planner 210 can be configured to employ one or more techniques for identifying an angle that is best aligned with the boundary of an area to be cut. By identifying a best aligned angle, path planner 210 can facilitate the creation of a path that includes parallel lines that are best aligned with the boundary to thereby enhance the mowing efficiency without sacrificing aesthetics.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media are categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similar storage medium which can be used to store desired program code means in the form of computer-executable instructions or data structures and which can be accessed by a general purpose or special purpose computer. Transmission media include signals and carrier waves. Because computer storage media and transmission media are disjoint categories, computer storage media does not include signals or carrier waves.

Computer-executable instructions comprise, for example, instructions and data which, when executed by a processor, cause a general-purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, smart watches, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A method for planning a path for mowing an area, performed by processors, the method comprising:
   identifying a boundary of the area, wherein the boundary is defined by coordinates;
   generating boundary segment vectors for pairs of the coordinates;
   identifying a first angle from a range of angles as a best aligned angle for the boundary;
   creating the path for mowing the area, the path including parallel lines that are oriented in accordance with the best aligned angle; and
   providing the path to a mower to cause the mower to mow the area by following the path.

2. The method of claim 1, wherein the mower is autonomous.

3. The method of claim 1, wherein the boundary segment vectors are generated for successive pairs of the coordinates.

4. The method of claim 1, further comprising:
   comparing the boundary segment vectors to a set of vectors corresponding to the range of angles.

5. The method of claim 4, further comprising:
   based on the comparison, generating results for each angle in the range of angles, each result representing a number or proportion of boundary segment vectors that are aligned with the respective vector.

6. The method of claim 5, wherein comparing the boundary segment vectors to the set of vectors corresponding to the range of angles comprises calculating, for each vector in the set of vectors, dot products of the respective vector and the boundary segment vectors, wherein the result for the respective vector comprises a sum of the dot products for the respective vector.

7. The method of claim 6, wherein the result for the respective vector comprises a sum of the dot products for the respective vector after raising each of the dot products to an even number.

8. The method of claim 5, wherein identifying the first angle as the best aligned angle comprises selecting the first angle based on the result for the first angle.

9. The method of claim 8, wherein selecting the first angle based on the result for the first angle comprises determining that the result for the first angle is a maximum result.

10. The method of claim 8, wherein selecting the first angle based on the result for the first angle comprises determining that the result for the first angle exceeds a threshold.

11. The method of claim 1, wherein the parallel lines are oriented at or within a threshold of the best aligned angle.

12. The method of claim 1, further comprising:
identifying curvature spikes in the boundary; and
identifying intervening segments between adjacent curvature spikes;
wherein identifying the first angle from the range of angles as the best aligned angle for the boundary comprises determining that a first intervening segment of the intervening segments is oriented at the first angle.

13. The method of claim 12, wherein determining that the first intervening segment is oriented at the first angle comprises calculating a vector for the first intervening segment.

14. The method of claim 12, wherein identifying the first angle from the range of angles as the best aligned angle for the boundary further comprises determining that one or more additional intervening segments of the intervening segments are oriented at the first angle.

15. The method of claim 12, wherein identifying curvature spikes in the boundary comprises:
creating sets of coordinates from the coordinates defining the boundary; and
for each set, calculating a curvature value.

16. The method of claim 15, wherein the sets of coordinates include three coordinates and wherein calculating the curvature value for each set comprises calculating a circle having a circumference that aligns with the three coordinates in the set.

17. One or more non-transitory computer storage media storing computer executable instructions which when executed implement a method for planning a path for mowing an area, the method comprising:
identifying a boundary of the area by obtaining coordinates that define the boundary of the area;
creating boundary segment vectors from pairs of the coordinates;
for each angle in a range of angles, creating a vector corresponding to the angle and comparing the vector to each of the boundary segment vectors to generate a result for the angle, wherein comparing the vector to each of the boundary segment vectors comprises calculating a dot product and wherein the result for each angle is generated by raising the respective dot products to an even value and summing the raised dot products;
based on the results for the range of angles, identifying a first angle from the range of angles as a best aligned angle for the boundary;
creating the path for mowing the area, the path including parallel lines that are oriented in accordance with the best aligned angle; and
providing the path to a mower to cause the mower to mow the area by following the path.

18. The computer storage media of claim 17, wherein the mower is autonomous.

19. One or more non-transitory computer storage media storing computer executable instructions which when executed implement a method for planning a path for mowing an area, the method comprising:
identifying a boundary of the area by obtaining coordinates that define the boundary of the area;
processing the coordinates to identify curvature spikes in the boundary by creating sets of the coordinates and calculating a circle for each set using the coordinates of the set;
identifying intervening segments between adjacent curvature spikes;
determining angles of the intervening segments;
selecting a first angle of the determined angles as a best aligned angle;
creating the path for mowing the area, the path including parallel lines that are oriented in accordance with the best aligned angle; and
providing the path to a mower to cause the mower to mow the area by following the path.

20. The computer storage media of claim 19, wherein the mower is autonomous.

* * * * *